United States Patent [19]
Casey

[11] Patent Number: 5,915,941
[45] Date of Patent: Jun. 29, 1999

[54] LIGHTED FISHING BOBBER

[76] Inventor: Louis Michael Casey, 1910 Katrinka Rd., Medina, Minn. 55340

[21] Appl. No.: 09/047,201

[22] Filed: Mar. 24, 1998

Related U.S. Application Data

[62] Division of application No. 08/800,522, Feb. 19, 1997.

[51] Int. Cl.⁶ .................................................. A01K 93/00
[52] U.S. Cl. ...................... 43/17.5; 43/44.87; 43/44.9; 43/44.91
[58] Field of Search .................. 43/17.5, 44.87, 43/44.9, 44.91

[56] References Cited

U.S. PATENT DOCUMENTS

| | | | |
|---|---|---|---|
| 1,547,746 | 7/1925 | Gore | 43/17.5 |
| 1,883,574 | 10/1932 | Cleeland | 43/44.9 |
| 2,272,802 | 2/1942 | High et al. | 43/17.5 |
| 2,485,087 | 10/1949 | Diamond | 43/17.5 |
| 2,527,956 | 10/1950 | Peevey | 43/17.5 |
| 2,957,266 | 10/1960 | Pfister | 43/44.91 |
| 2,984,931 | 5/1961 | Shaw | 43/44.91 |
| 3,056,229 | 10/1962 | Haney | 43/44.87 |
| 3,421,246 | 1/1969 | Jinushi et al. | 43/17.5 |
| 3,733,734 | 5/1973 | Hysaw | 43/44.9 |
| 3,798,822 | 3/1974 | Lampus | 43/17.5 |
| 3,913,256 | 10/1975 | Morris et al. | 43/17.5 |
| 3,935,658 | 2/1976 | Simpson | 43/17.5 |
| 3,940,868 | 3/1976 | Northcutt . | |
| 4,070,784 | 1/1978 | Yokogawa et al. | 43/17.5 |
| 4,251,941 | 2/1981 | Howard | 43/44.91 |
| 4,291,484 | 9/1981 | Young | 43/17.5 |
| 4,437,255 | 3/1984 | Reed . | |
| 4,437,256 | 3/1984 | Kulak | 43/17.5 |
| 4,458,439 | 7/1984 | Garrett, Sr. | 43/44.87 |
| 4,461,114 | 7/1984 | Riead | 43/17.5 |
| 4,486,969 | 12/1984 | Swenson . | |
| 4,516,349 | 5/1985 | Klocksiem | 43/17.5 |
| 4,615,136 | 10/1986 | Bank | 43/44.91 |
| 4,649,660 | 3/1987 | Kurka et al. | 43/17.5 |
| 4,658,532 | 4/1987 | McFarland et al. | 43/17.5 |
| 4,748,760 | 6/1988 | Widmer . | |
| 4,748,761 | 6/1988 | Machovina | 43/17.5 |
| 4,760,664 | 8/1988 | Amednola . | |
| 4,763,433 | 8/1988 | Kulak . | |
| 4,777,756 | 10/1988 | Mattison | 43/17.6 |
| 4,827,655 | 5/1989 | Reed | 43/17.5 |
| 4,884,355 | 12/1989 | Neihoff et al. | 43/17.5 |
| 4,891,902 | 1/1990 | Whitney, Jr. | 43/44.87 |
| 4,916,846 | 4/1990 | Pehm | 43/17.5 |
| 4,922,643 | 5/1990 | Everett | 43/17.5 |
| 5,036,615 | 8/1991 | Lu | 43/17.5 |
| 5,052,145 | 10/1991 | Wang | 43/17.5 |
| 5,063,700 | 11/1991 | Kiefer et al. | 43/17.6 |
| 5,076,003 | 12/1991 | Chen | 43/17.5 |
| 5,119,578 | 6/1992 | Johnson | 43/17.5 |
| 5,157,857 | 10/1992 | Livingston | 43/17.5 |
| 5,165,195 | 11/1992 | Matsui | 43/44.9 |
| 5,199,205 | 4/1993 | Klammer | 43/17.5 |
| 5,241,774 | 9/1993 | Rayburn | 43/44.9 |
| 5,351,431 | 10/1994 | Ryu | 43/17.5 |
| 5,351,432 | 10/1994 | Tse | 43/17.5 |
| 5,377,444 | 1/1995 | Gibney, Sr. | 43/44.91 |
| 5,615,512 | 4/1997 | Wang | 43/17.5 |

FOREIGN PATENT DOCUMENTS

| | | |
|---|---|---|
| 475984 | 10/1975 | U.S.S.R. . |
| 1115693 | 8/1992 | U.S.S.R. . |

*Primary Examiner*—Michael J. Carone
*Assistant Examiner*—Darren W. Ark
*Attorney, Agent, or Firm*—Moore & Hansen

[57] ABSTRACT

A lighted slipbobber receives the fishing line along its vertical central axis to maximize stability and includes a blinking LED protectively encapsulated within the bobber body and laterally offset from the central axis. A light pipe extends from the offset LED to the top of the bobber and terminates in a lens on the vertical central axis. The LED is energized by an improved capacitive energy storage circuit within the bobber, and the circuit significantly increases operating time between recharging of the circuit. No batteries are carried by the bobber.

11 Claims, 2 Drawing Sheets

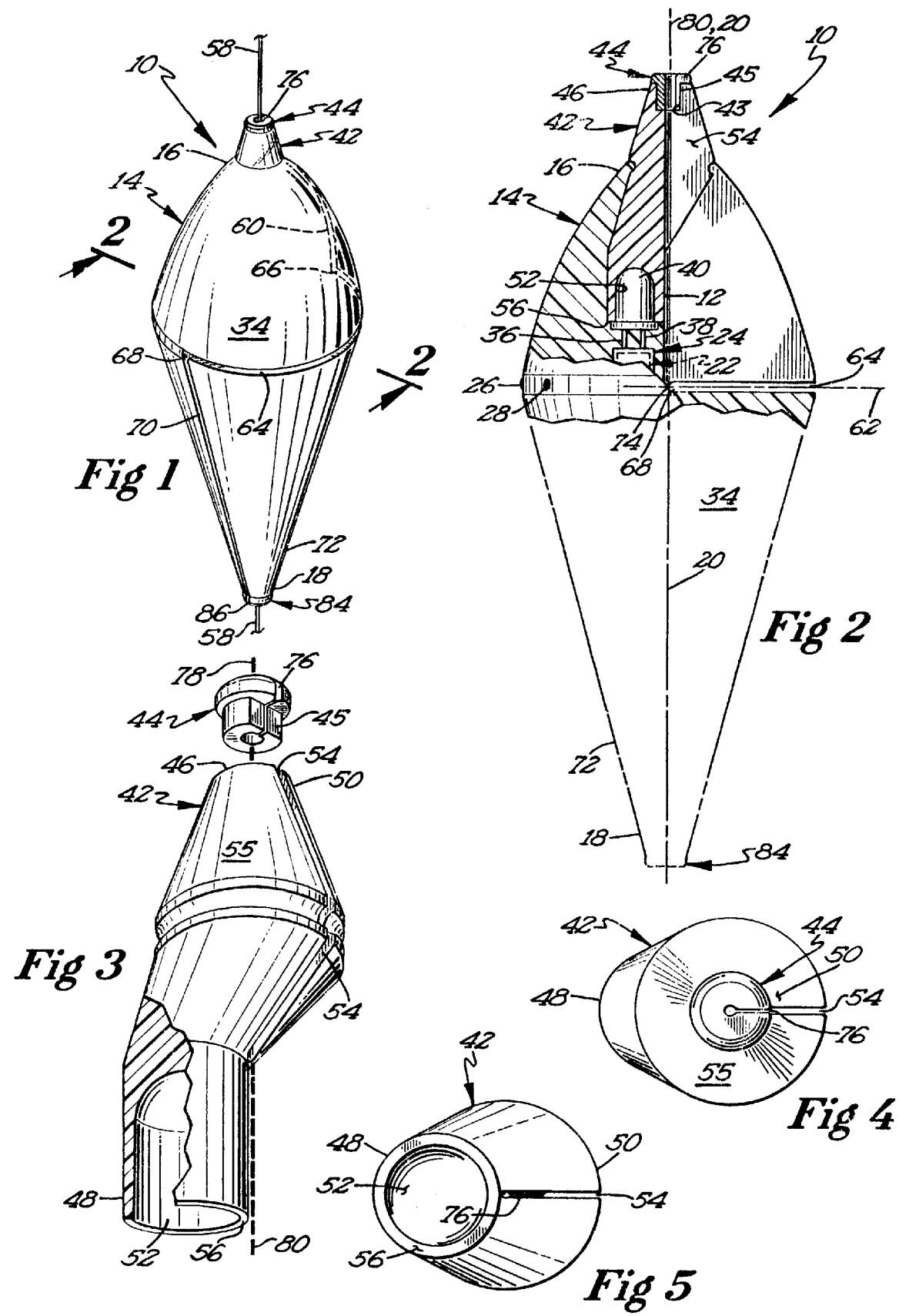

LIGHTED FISHING BOBBER

This is a division of pending application Ser. No. 08/800,522 filed Feb. 19, 1997.

BACKGROUND OF THE INVENTION

The present invention relates generally to the field of fishing bobbers, and specifically to lighted fishing bobbers.

Bobbers are commonly used in fishing to control the depth at which a baited hook or lure is suspended and to indicate when a fish has taken the hook. When a fish takes the bait or lure, the attached bobber will move, alerting the angler to the presence of a fish on the line. Various conditions and types of fishing call for various sizes and types of bobbers.

A more specialized bobber called a slip bobber is also capable of defining the depth at which a bait or lure is suspended. Slip bobbers have the ability to slide freely on the fishing line, and with fixed knots or bobber stops secured to the line above the bobber, the bait may be suspended to a pre-determined depth below the bobber. The bobber stop is generally capable of being freely wound on and discharged from a fishing reel, allowing more convenience in controlling the casting and retrieving of bait with most any type of rod and reel combination where the depth of the bait exceeds the length of the fishing rod. Use of the slip bobber allows excellent bait depth control in many fishing applications.

Unlighted slip bobbers are well known. In such bobbers the line is threaded through a channel along the vertical center axis of the bobber, allowing the bobber to move freely on the line, subject to stops or knots placed appropriately by the angler. Attachment of such a slip bobber to a fishing line generally requires disconnecting the line from the lure and leader. Such detachment is inconvenient and time consuming under the best conditions and still more of a problem when done in low light conditions.

Most lighted bobbers utilize internal batteries that must be periodically replaced. Such bobbers expose the bobber circuitry to the elements when replacing the batteries, require extra time, particularly at night, in opening and closing the bobber to replace batteries, incur the risk of water leakage into the battery chamber, and during the lifetime of the bobber, become increasingly troublesome to operate due to their more exposed and vulnerable components.

A number of lighted slip bobbers have been available to fisherman but have configurations which are structurally unbalanced and thus difficult to cast from a casting or spinning rod. Most such lighted slip bobbers have utilized an internal battery to supply energy, and consequently have encountered serious long term problems with effectively sealing the bobbers and preserving their integrity while still being able to remove and change the batteries.

Fishing with an unlighted bobber at dusk or after dark is challenging because seeing the bobber or detecting subtle movements thereof can be difficult under low light conditions. Consequently, the presence of a lighted bobber during such fishing conditions can be extremely helpful. An elongated lighted bobber using a light emitting diode (LED) is described in U.S. Pat. No. 5,157,857 to Kent A. Livingston.

The '857 bobber has its LED positioned towards the lower portion of the bobber in a translucent sealed tube on the bobber's vertical center axis. The '857 bobber is a sealed unit and functions without any battery power source being carried on the bobber. The capacitive energy storage circuitry within the bobber, and which energizes the LED, is charged by touching the terminals of an external battery to contacts on the external surface of the bobber.

The '857 bobber can function as a slipbobber and has an eyelet at the upper end of the translucent tube, permitting the fishing line to slide through the eyelet and support the bait below the bobber. When no fish is tugging at the bait, the '857 bobber is balanced to float with the eyelet end of the tube upward and the LED underwater at the bottom of the bobber body. When a fish pulls on the bait, the eyelet end of the tube provides the leverage needed for the fishing line to tip the bobber upside down and wholly immerse the eyelet end of the tube and the adjacent bobber body. When the upper portion of the '857 bobber is tipped so as to submerge it underwater, the water creates a short circuit between two contacts on such upper portion, and the internal circuit then turns the LED on and causes it to blink on and off at a fast, almost continuously firing, rate while the two contacts are shorted. When the eyelet end of the bobber is upright and out of the water, the '857 bobber's LED is in a full off, nonblinking condition. The '857 patent also shows a second generally round bobber which does not have an elongated tube, but which otherwise functions like the bobber described above.

While the '857 bobber and its internal, energy storing circuit are an advance in this art, the bobber could be improved in several ways. For example, when the bobber is in use but not blinking, a fisherman has no way to be sure its energy storage circuit is not discharged, broken or otherwise inoperative, and he cannot be sure the bobber will light if a fish strikes. Without a steady blinking, the fisherman has nothing to confirm that the device is working or to tell him where it is in the water. In addition, when used in windy conditions or rough water, the somewhat unstable upper portion of the bobber can tip over even when no fish is on the line, and then the external contacts short circuit, thus giving a false indication of a fish on the line and needlessly wasting the stored energy with continuous firing of the LED. The '857 bobber, constructed with its eyelet and fishing line at the high end of the elongated tube, can carry only a predetermined amount of lure or bait weight before it will destabilize and tip over. Consequently, the lure or bait must not exceed such weight. By contrast, if the fishing line were positioned along the vertical center axis of the bobber, the bobber body would be more stable and float normally until the weight of the bait or the pulling of the fish is so great that the bobber sinks. Because the '857 bobber has its LED on its center axis, the fishing line cannot be positioned along the vertical center axis of the bobber. Consequently, the attachment of the line to the upper end of the tube or the top of the bobber has been necessary, even through that arrangement causes the bobber to tip over and invert under various non-fish strike conditions. When the '857 bobber is retrieved or if the bait snags in weeds or other underwater obstructions, or the bait is jiggled by the fisherman, the electrical contacts can be shorted, and the LED begins its continual firing and needlessly consumes its stored energy. It would be desirable to have a slip bobber which is more stable, does not give false indications by turning its LED on when the bobber tips due to wind and wave action, and whose energy storage circuit will operate for a more extended time.

The Livingston elongated bobber is marketed by Living Lures, Ltd. in a variation not disclosed in the '857 patent wherein the LED is positioned within the described outwardly extending translucent tube and at the upper portion of the bobber. This variation has the eyelet positioned at the lower end of the tube and thus always underwater. This variation is designed to have the LED float above the water and its circuit is designed to have the LED blink at a first rate at all times when its circuit is charged. In addition the circuit turns the LED on virtually continuously when the upper portion of the bobber becomes immersed sufficiently in the water so that a pair of contacts on the upper portion are short circuited. This variation results in the energy storage circuit being able to keep the bobber blinking at the first rate for about one hour under ideal conditions where no shorting of the contact occur. Its light emission level steadily decreases after about the first hour and becomes increasingly hard to see. In a continuously on state, the circuit depletes its energy in about a quarter hour. Under actual fishing conditions where the bobber contacts become short circuited due to wind and rough water action, the one hour of normal blinking will be significantly reduced. A longer operational time between needed charging of the circuit would be helpful.

While Livingston Lures variation is an improvement over the bobbers shown in the '857 patent, the variation's use of the long vertical tube on its center axis and the attachment of the fishing line at the lower end of that tube tends to excessively tip the bobber and needlessly destabilize it in rough water, waves or windy conditions and also when the bobber is being retrieved after casting. Whenever the bobber is destabilized by such causes and its contacts are short circuited, the LED lights continuously, giving a false reading and also more quickly depleting the limited energy storage circuit. It is desirable to eliminate the high energy continuously lighted LED operation of the Livingston bobber, and to increase the time during which the LED will operate without a recharging. It is also desirable to have a lighted slip bobber whose fishing line passes along its vertical center axis such that the bobber is as stable as possible in the water. Placement of the Livingston LED in the elongated tube reduces the light radiated from the LED, and placing the LED near the bobber outer surface also makes the bobber more vulnerable to impact damage during casting due to the LED having minimal encapsulation in the bobber body. It would be desirable to provide a lighted slip bobber that better protects the LED from impact shock and breakage, yet still provides greater LED visibility, a faster blinking frequency of the LED light source, significantly longer operation on a single charging of the internal circuit and the ability to keep the fishing line along the center axis of the slip bobber while also permitting the fishing line to be easily removed from the bobber without disassembly of the line from bait or lure. Applicant's invention addresses these structural shortcomings and provides a solution.

SUMMARY OF THE INVENTION

The present invention overcomes the problems of the prior art by providing a long lasting, faster blinking, rechargeable, internal LED lighted slip bobber having its LED protectively positioned well within the bobber. The circuitry and LED of the bobber are protectively encased within the water buoyant and opaque sealed body of the bobber. A light pipe or channel conducts light from the internally mounted and protected LED to a tip outside the bobber, and the light pipe and tip significantly enhance the visibility of the light. The present invention is rechargeable through the use of isolated external leads, with the leads protected from current leakage and shorting by the body of the bobber as well as circuit components.

The circuitry and LED of the present invention are located within the body of the bobber, and are isolated and protected from external elements and forces. To allow operation as a slip bobber, the invention positions a fishing line channel along the center axis of the bobber. In order for the fishing line channel to be placed along the center axis of the bobber, the internal circuitry and LED have been mounted off the center axis within the bobber. The light pipe delivers light from the offset LED to an external location on the vertical axis of the bobber without interfering with the fishing line. This light pipe terminates on the external face of the bobber with a tip which serves as a lens to enhance the visibility of the light by spreading the viewable light surface over a larger area than that of a standard LED light source, thereby making the bobber more visible and from greater distances.

The ignition circuit for the LED is designed to minimize energy use and loss, and includes two transistors in an oscillator, combined with other electronic components chosen to maximize performance. Under normal conditions the bobber LED of this invention will flash effectively during actual fishing conditions for a period in excess of two hours under even windy, rough water conditions. The capacitive circuit is charged by application of an external battery to leads extending from the circuitry and terminating on the external face of the bobber body. The leads are isolated to control current flow so that the circuit does not short or leak when immersed in water.

The invention combines specially chosen circuit components and values to maximize the time of effective operation between recharging. A single charging of the circuit results in a use life of approximately two or more hours, more than double that achieved by the Livingston device.

An alternative embodiment of the slip bobber uses a configuration of slots which allow the bobber to be attached to and removed from the fishing line without cutting the line or detaching the line from the bait or lure to which it is attached.

These and other benefits of the present invention will become apparent from the following detailed description taken in conjunction with the accompanying drawings.

BRIEF DESCRIPTION OF THE DRAWINGS

FIG. 1 is a perspective view of a lighted slip bobber embodying the invention;

FIG. 2 is a partial sectional view of the bobber of FIG. 1, taken along lines 2—2 of Fig.1;

FIG. 3 is a perspective view of a light pipe used with the embodiment of FIG. 1;

FIG. 4 is a top view of the light pipe of FIG. 3;

FIG. 5 is a bottom view of the light pipe of FIG. 3;

DESCRIPTION OF THE PREFERRED EMBODIMENTS

Figure 6:
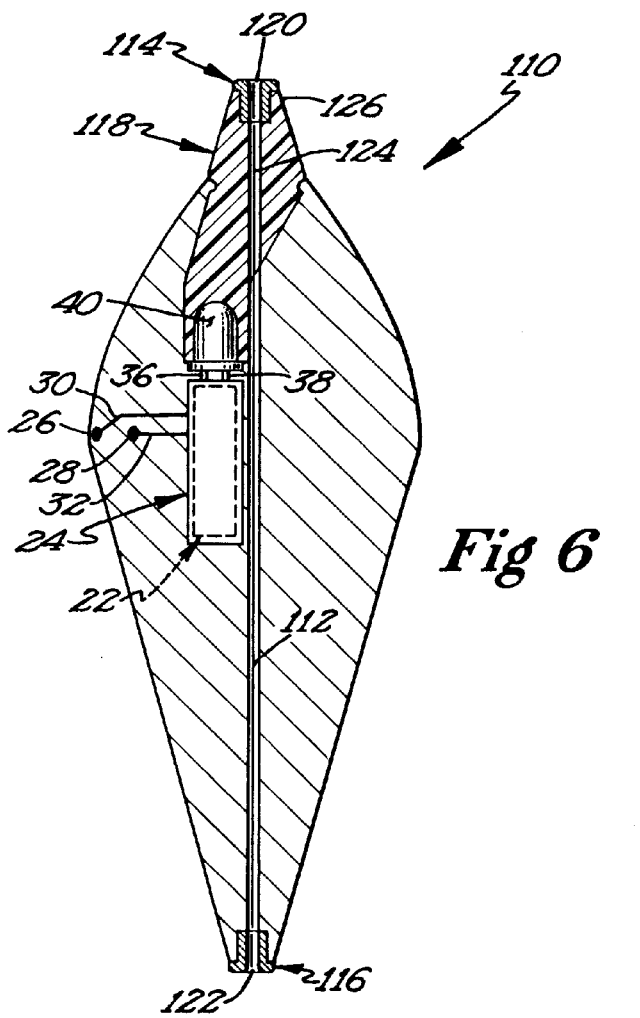
FIG. 6 is a cross sectional view of a second embodiment of a lighted slip bobber.

Referring now to FIGS. 1 and 2, a lighted slip type bobber 10 which is removable from a fishing line 58 without removal of fishing gear which may include hooks, leaders, lures, or a combination thereof, has a central fishing line channel 12 extending substantially vertically through its body 14 from top 16 to bottom 18 along longitudinal center axis 20. An activation circuit 22 is encapsulated within module 24 of the body 14 and positioned laterally of axis 20. Body 14 is a flotation body and is preferably formed of foamed plastic, which is generally opaque to light, buoyant in water and waterproof. Activation circuit 22 (described hereafter) is a capacitive storage circuit, and is charged by applying the contacts of an external battery (not shown) to bobber contacts 26 and 28. First and second leads 30 and 32 extend from circuit module 24 and terminate at contacts 26 and 28, respectively, on the external surface 34 of body 14. Circuit 22 includes electrical connections 36 and 38 to a light emitting diode (LED) 40. LED 40 is turned on and off intermittently by circuit 22. Since LED 40 is encapsulated within opaque body 14, means for adequately transmitting or transferring light from LED 40 to the external surface 34 of body 14 is provided. The preferred means to transmit or transfer light from within body 14 to external surface 34 so that light may be easily seen by the angler is by way of a light pipe 42, which will be described in detail below.

Light pipe 42 extends from LED 40 to and above bobber top 16. Light pipe 42 includes a light radiating tip or lens 44 located at the upper end 46 of pipe 42 and receiving light from LED 40. Alternatively, light pipe 42 may be formed without tip 44 provided the pipe 42 is formed of an effective light radiating material. Light pipe 42 has a lower section 48 and an upper section 50. Lower section 48 and upper section 50 are axially offset from one another, with lower section 48 positioned off the center axis 20 of body 14 and off the center pipe axis 80. Lower section 48 of light pipe 42 has a recess 52 sized to receive LED 40 therein so that LED 40 will transmit its light directly into light pipe 42 and is also protected by the lower section 48. This close proximity between LED 40 and recess 52 enhances light transfer from LED 40 to light pipe 42. Since light pipe 42 has an offset upper section 50 on axis 20, the pipe 42 has a fishing line receiving slot or channel 54 in the upper section 50 thereof, extending between the axis 80 and the outside of the pipe 42 as best shown in FIG. 3. Light pipe 42 and tip 44 are formed of a material that will transmit light from LED 40 to the upper end 46 of the pipe so that light may be seen from points external to the bobber 10. Although a number of materials will suffice, the preferred material is a light conducting thermoplastic such as that sold under the trademark LUCITE. The LUCITE material serves to effectively transmit light from LED 40 and also to be highly visible allowing the exposed upper section 50 and the entire tip 44 to be easily seen in low light by an observer.

Recess 52, sized to accommodate LED 40, is positioned at the lower end 56 of light pipe 42, in the lower section 48. LED 40 and lower section 48 of light pipe 42 cannot be located centrally within body 14 on axis 20 because in a slip bobber, it is desirable that the fishing line extend axially through the center of the bobber. The line 58 cannot extend through LED 40, so LED 40, lower section 48, and its recess 52 are offset from the central channel 12 of bobber 10. In order to most effectively transmit light to an observer, the upper section 50 of light pipe 42 must be centered on the body 14 and the tip 44 is best positioned at the very top of the light pipe 42 for optimum visibility. Therefore, upper section 50 and lower section 48 of light pipe 42 are offset, as shown in FIGS. 2 and 3.

Removable lighted slip bobber 10 contains a series of slots therein which collectively form or communicate with central channel 12 in order to allow bobber 10 to be put in place on a fishing line 58 without removal of the line 58 from fishing gear. Slot 60 communicates with and extends from tip 44 to plane 62 of bobber 10 and from external surface 34 through to central channel 12. Plane 62 is preferably horizontal, but may also be canted. Slot 64 extends from external surface 34 to central channel 12 in a horizontal semicircular arc configuration along plane 62 of bobber 10. The first circumferential end 66 of slot 64 communicates with the slot 60 where slot 60 meets plane 62 of bobber 10 on external surface 34. The other circumferential end 68 of slot 64 is spaced apart from first circumferential end 66 around the body 14 of bobber 10 from end 66. For the greatest security against line 58 inadvertently escaping from bobber 10, the angular spacing between end 66 and 68 is 180 degrees. Lesser angular spacings are also effective. Slot 70 extends from central channel 12 to external surface 34 along the lower half 72 of bobber 10, as best shown in FIG. 1. Slots 60 and 70 have a common point at center point 74 of bobber 10. Slots 60 and 70 intersect with plane 62 at center point 74 and communicate with central channel 12 of bobber 10.

In order to ensure that slot 60 extends fully from plane 62 through tip 44 of bobber 10, tip 44 and light pipe 42 also have channels 76 and 54 respectively. Tip 44 has channel 76 which extends to the vertical center line 78 (FIG. 3) of tip 44, and which aligns with slot 54 of upper section 50 of the light pipe. Similarly, light pipe 42 has its fishing line channel 54 which extends along the center axis 80 of pipe 42, shown best in FIG. 3, with slot 54 extending from axis 80 to the outer surface 55 of light pipe 42. Channel or slot 54 is aligned with slot 60 of bobber 10 to allow easy insertion of the fishing line 58. Shoulder 45 on tip 44 is used to align channels or slots 54, 60, and 76. Shoulder 45 communicates with surface 43 on light pipe 42 to assure alignment.

Tip 44 has its slot 76 narrowed more than communicating slot 54 of pipe 42. This narrowing of slot 76 allows the fishing line of 58 to be forced through the slot 76 by the angler, but the narrowing effectively prevents the fishing line escaping the tip 44 on its own once the line is installed on axis 78.

Bottom tip 84, positioned at the lower end of the bobber 10, is identical to top tip 44, with the exception being that its slot 86, which is narrowed like slot 76, is aligned with slot 70 of bobber 10.

In operation, bobber 10 is positioned on fishing line 58 as follows. Line 58 is inserted into vertical slot 76, and at the same time into vertical slots 54 and 60 which are aligned with slot 76, until a section of line 58 may be inserted into horizontal slot 64. When line 58 has been inserted into slot 64, line 58 may be pulled in a horizontal arc along plane 62 of bobber 10 until a portion of line 58 may be inserted into vertical slot 70 and similarly into slot 86 of lower tip 84. Following this, line 58 is pulled taut, at which point line 58 is fully situated in central channel 12 of bobber 10, extending form upper tip 44 to lower tip 84 and having been seated entirely without removal of line 58 from a lure or leader.

Figure 7:
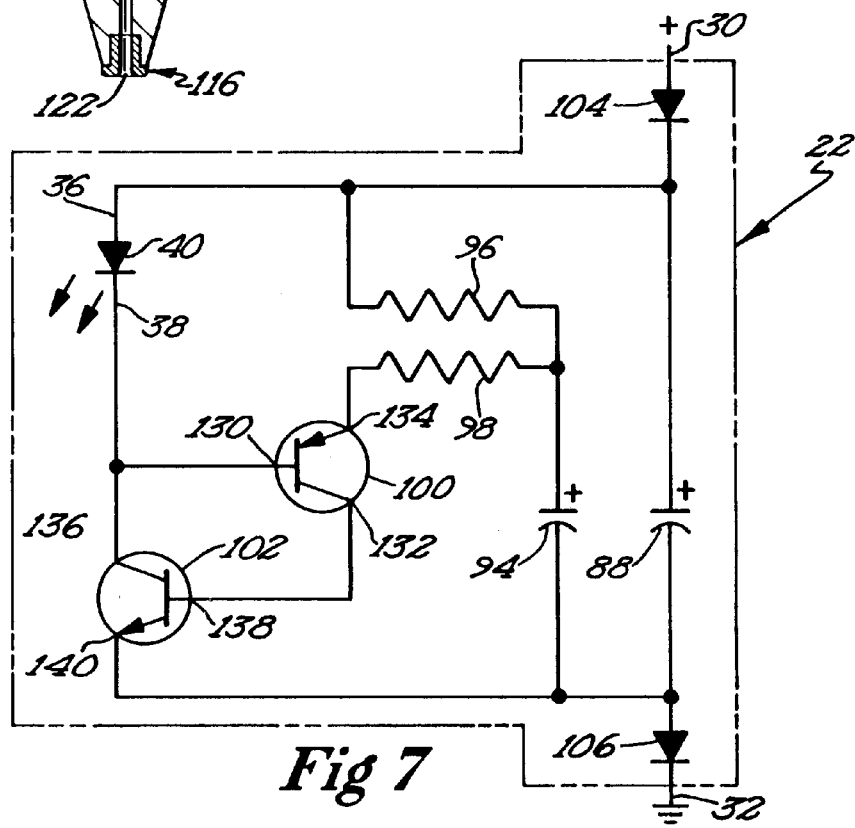
FIG. 7 is an electrical schematic diagram of the activation and control circuitry used with the invention.

A circuit diagram of activation circuit 22 is shown in FIG. 7. Circuit 22 may be enclosed in a module 24 and is offset from longitudinal axis 20 within the body 14. Internal leads 30 and 32 extend from activation circuit 22 to the external surface 34 of body 14. To charge the circuit 22, an external battery is applied to the leads 30 and 32 at contacts 26 and 28. Circuit 22 is isolated from external elements by body 14 and by other circuit elements. Touching the terminals of a battery to contacts 26 and 28 for a few seconds charges charging capacitor 88 which until it discharges fully becomes the power source for circuit 22. A standard 9 volt battery is the preferred battery for charging the circuit 22, and leads 30 and 32 are arranged to accommodate such a battery.

The positioning of LED 40 close to circuit 22 allows LED 40 to have short leads 36 and 38, which connect LED 40 to circuit 22. These short leads reduce the required power otherwise needed to operate the circuit 22, providing longer operating times for LED 40 than previous known circuits. The LED's used by known lighted bobbers have always required longer leads due to the positioning of their LEDs outside the external surface of the bobber. With placement of the LED 40 internally within the body 14 of the bobber 10, the present invention also minimizes the potential for physical damage to leads 36 and 38 during high pressure injection molding, which may be used to form the body 14 of bobber 10.

Circuit 22 is arranged as follows. The positive terminal of a charging capacitor 88 is electrically connected to the first terminal of a timing resistor 96 and to the first terminal 36 of LED 40. A first transistor 100 having a base 130, collector 132, and emitter 134 has its base 130 electrically connected to second terminal 38 of LED 40, and also to the collector 136 of a second transistor 102. Base 138 of second transistor 102 is electrically connected to collector 132 of first transistor 100. The positive terminal of a timing capacitor 94 is electrically connected to the second terminal of timing resistor 96 in a series combination which is parallel to the charging capacitor 88. The negative terminals of timing capacitor 94 and charging capacitor 88 are electrically connected to each other and to the emitter 140 of second transistor 102. A discharge resistor 98 is electrically connected between the positive terminal of timing capacitor 94 and the emitter 134 of first transistor 100.

Charging capacitor 88 is preferably an electrolytic double layer capacitor and acts as a storage medium and power source for circuit 22. Charging capacitor 88 charges timing capacitor 94 through timing resistor 96. The resistance value chosen for timing resistor 96 depends on the time it is wished to take to charge timing capacitor 94. The larger the resistance of timing resistor 96, the slower the charging of timing capacitor 94. Current flows through timing resistor 96 to timing capacitor 94 in order to charge timing capacitor 94. The RC constant of timing resistor 96 and timing capacitor 94 determines the time between firing or lighting of LED 40.

Once timing capacitor 94 is fully charged, it discharges through discharge resistor 98, which has a resistance chosen to direct discharge therethrough instead of through timing resistor 96. This is accomplished by choosing the resistance of discharge resistor 98 to be lower than that of timing resistor 96. The RC constant of timing capacitor 94 and discharge resistor 50 determines how long LED 40 will be lit.

Discharge resistor 98, timing capacitor 94, and first transistor 100 constitute an oscillator circuit. When timing capacitor 94 discharges through discharge resistor 98 to the emitter of first transistor 100, with a frequency determined by the values of timing resistor 98 and timing capacitor 94, the discharge turns first transistor 100 on at intervals. The frequency of the intervals at which first transistor 100 is turned on is determined by the RC constant of the discharge resistor 98 and timing capacitor 94. Once first transistor 100 turns on, timing capacitor 94 discharges through discharge resistor 98 and transistor 100, which is used as a switch. The discharge of the RC circuit defined by capacitor 94 and resistor 98 controls the amount of time LED 40 is lit, by turning second transistor 102 on at the frequency of the signal from the RC circuit supplied through the collector of first transistor 100 at the base of second transistor 102. When first transistor 100 turns off, second transistor 102 turns off in response. Second transistor 102 therefore acts as a switch which is biased open and closed in relation to the status of first transistor 100. In this way, the first and second transistors 100 and 102 form a two transistor oscillator circuit. Transistor 100 is shown as a PNP type transistor, and transistor 102 is shown as an NPN type transistor.

When transistor 102 turns on, it functions as a closed switch, creating a voltage drop across LED 40, turning LED 40 on. When timing capacitor 94 fully discharges, transistor 100 will turn off, and transistor 102 will follow by turning off. Once transistor 102 turns off, it functions as an open switch, and LED 40 also turns off. At that time, power source capacitor 88 will begin recharging capacitor 94.

In this manner, the capacitive circuit 22 operates LED 40, causing it to turn on and off intermittently. The circuit will continue to run until the charge fully leaks from charging capacitor 88. When this happens, the circuit 22 may be reactivated by applying a battery to contacts 26 and 28 of leads 30 and 32 to recharge capacitor 88.

The two RC constants, namely the RC charging constant of resistor 96 and capacitor 94, and the discharge RC constant of resistor 98 and capacitor 94, control respectively the length of time that LED 40 is off or on. Varying the resistance of timing resistor 96 or discharge resistor 98 will allow control of the period of blinking of LED 40. The length of time between blinks of LED 40 is determined by the time constant of resistor 96 and capacitor 94. The length of time LED 40 is lit is controlled by the time constant of resistor 98 and capacitor 94.

A diode such as diode 104 or diode 106 may be placed in the position and orientation shown (FIG. 7) along leads 30 or 32 to control the flow of current to avoid current leakage and shorting from water to which activation leads 30 and 32 are exposed. Only one diode 104 or 106 is required to control current flow. The positioning of the diodes 104 and 106 shown in FIG. 7 indicate two different diode positions each of which may be employed to control current flow. Only one such diode is required.

It has been found that use of an electrolytic layer capacitor with a capacitance between 0.1–1.0 Farads (F) is highly effective for use as charging capacitor 88. Capacitor 94 is preferably a resin dipped solid capacitor with a capacitance between 0.1–47 microfarad ($\mu$F). LED 40 is a general purpose bright LED. Timing resistor 96 is preferably a one-eighth to one-quarter watt resistor with a resistance of 1000 Ohms. Discharge resistor 98 is preferably a one-eighth to one-quarter watt resistor having a resistance from 220 Ohms to 1,000 Ohms. These component values produce a superior bobber circuit with a bright firing action and an exceptionally long term of operation on the order of two or more hours.

FIG. 6 discloses an alternative embodiment 110 of a lighted slip bobber. Bobber 110 has an overall configuration similar to bobber 10 and uses the same LED 40 and circuit 22. Bobber 10 has a central vertical channel 112 which is formed by molding or other means. Bobber 110 is not removable from fishing line 58 in the same fashion as bobber 10. To place bobber 110 on fishing line 58, line 58 is threaded through channel 112. Since alternative bobber 110 has no slot configuration like bobber 10, alternative top and bottom tips 114 and 116, and alternative light pipe 118, also need not have slots. Top and bottom tips 114 and 116 have central bores 120 and 122, respectively, therethrough for receiving line 58. Light pipe 118, while having no slot, instead has central bore 124 in upper section 126, bore 124 communicating with central channel 112 for passage of line 58 therethrough. Since the circuitry of alternative bobber 110 is identical to that of bobber 10, it will not be described further.

Both bobber 10 and bobber 110 may be constrained to move within a predetermined length of the fishing line 58, by conventional bobber stops, also not shown.

The detailed description outlined above is considered to be illustrative only of the principles of the invention. Numerous changes and modifications will occur to those skilled in the art, and there is no intention to restrict the scope of the invention to the detailed description. The preferred embodiments of the invention having been described in detail the scope of the invention should be defined by the following claims.

What is claimed:

1. A lighted slip bobber for fishing when low light conditions require a high visibility bobber, said bobber comprising:

a flotation body of water buoyant material having an external surface, a top and a bottom, and a central channel extending through said body from said top to said bottom;

a light emitting diode within said body and offset from said central channel;

circuit means within said body and operatively electrically connected to said diode so as to actuate said diode;

a light transmitting structure having a lower section with a recess formed therein, said diode fitting within said recess in said lower section of said light transmitting structure, said light transmitting structure having an upper section extending from within said flotation body to said external surface of said flotation body, said light transmitting structure transmitting light from said light emitting diode to a location upon said external surface of said flotation body that is immediately circumjacent said central channel.

2. The lighted slip bobber described in claim 1, wherein: said upper section is offset from said lower section, said lower section is offset from said central channel, and said upper section is positioned along said central channel substantially.

3. The lighted slip bobber described in claim 2, wherein said light transmitting structure further comprises a translucent tip adjacent said upper section, said tip having a tip channel coaxial and communicating with said central channel.

4. A lighted fishing bobber resistant to destructive contact with obstructions and connectable to fishing line, comprising:

an opaque flotation body having a central axis and formed of water buoyant material having an external surface and a top, a bottom, and a central channel extending therethrough along said central axis from said top to said bottom to allow passage of the fishing line through said central channel;

a light emitting diode encased wholly within said opaque body, spaced laterally from said central axis, and spaced inwardly from said external surface to isolate said diode from destructive contact with the obstructions;

a light transmitting structure positioned in said body so as to transmit light from said light emitting diode to a location external of said body, said light transmitting structure including an upper section positioned along and immediately circumjacent to said central axis and said central channel, a lower section axially offset from said upper section and from said central axis, said upper section having a fishing line channel therethrough substantially coaxial with said central channel, and said lower section encased within said body and communicating with said light emitting diode, said upper and lower sections of said light transmitting structure cooperating to transmit light from said light emitting diode to said external surface of said flotation body at a location immediately circumjacent said central channel, and;

circuit means within said body and including a power source operatively connected to said light emitting diode, for actuating said light emitting diode.

5. The lighted fishing bobber described in claim 4, and wherein said upper section has an upper end and further including:

a light dispensing tip positioned at said upper end of said upper section of said light transmitting structure.

6. The lighted fishing bobber described in claim 4, wherein:

said lower section has a recess into which said light emitting diode is received to enhance transmission of light to said light transmitting structure and further protect said diode from destructive contacts.

7. The lighted fishing bobber described in claim 4, wherein said light transmitting structure is formed of translucent plastic.

8. A lighted fishing bobber resistant to destructive contact with obstructions and connectable to fishing line, comprising:

an opaque flotation body having a central axis and formed of water buoyant material having an external surface and a top, a bottom, and a central channel extending therethrough along said central axis from said top to said bottom to allow passage of the fishing line through said central channel;

a light emitting diode within said opaque body, spaced laterally from said central axis, and spaced inwardly from said external surface to isolate said diode from destructive contact with the obstructions;

a light transmitting structure positioned in said body so as to transmit light from said light emitting diode to a location external of said body, said light transmitting structure comprising:

an upper section positioned along and immediately circumjacent to said central channel, said upper section having a fishing line channel therethrough that is coaxial with said central channel;

a lower section axially offset from said upper section and encased within said body and communicating with said light emitting diode;

an intermediate section constructed and arranged to connect said upper and lower sections;

said lower section of said light transmitting structure transmitting light along a first path from said light emitting diode to said intermediate section, said intermediate section receiving light from said lower section and transmitting said light along a second path to said upper section of said light transmitting structure, said upper section receiving said light from said intermediate section and transmitting said light along a third path and emitting said light on the external surface of said flotation body at a location immediately circumjacent said central channel; and said second path intersecting said first and third paths, and;

circuit means within said body and including a power source operatively connected to said light emitting diode, for actuating said light emitting diode.

9. A lighted slip bobber which is easily removable from a fishing line with fishing gear thereon, comprising:

a flotation body of water buoyant material having an external surface and a top and a bottom, a central axis extending from said top to said bottom, and a transverse axis intersecting said central axis and positioned between said top and said bottom;

said body having a first slot extending from said external surface to said central axis and from said top of said body to a plane containing said transverse axis and intersecting said central axis;

said body having a second slot extending from said external surface to said central axis, and spaced apart around said external surface from said first slot, said second slot extending from said bottom of said body to said plane;

said body having a third slot within said plane, extending from said external surface to said central axis and connecting said first and second slots;

whereby said first, said second, and said third slots define a continuous path by which the fishing line may be removably inserted along said central axis without cutting the line or removing the fishing gear;

a light emitting diode encapsulated within said body off center from said central axis and spaced from said slots;

circuit means encapsulated within said body off center from said central axis and operatively electrically connected to said light emitting diode so as to operate said light emitting diode; and a transmitting structure having a recess, said light emitting diode fitting within said recess, said transmitting structure extending from said light emitting diode to said external surface and transmitting light from said light emitting diode to said external surface.

10. The lighted slip bobber described in claim 9, wherein said first slot and said second slot are spaced substantially 180 degrees apart around said central channel.

11. The lighted slip bobber described in claim 9, wherein said transverse axis is perpendicular to said central axis and said plane is perpendicular to said central axis.

* * * * *